June 7, 1938.  S. E. BRILLHART  2,119,570
STRAND HANDLING APPARATUS
Filed June 19, 1935
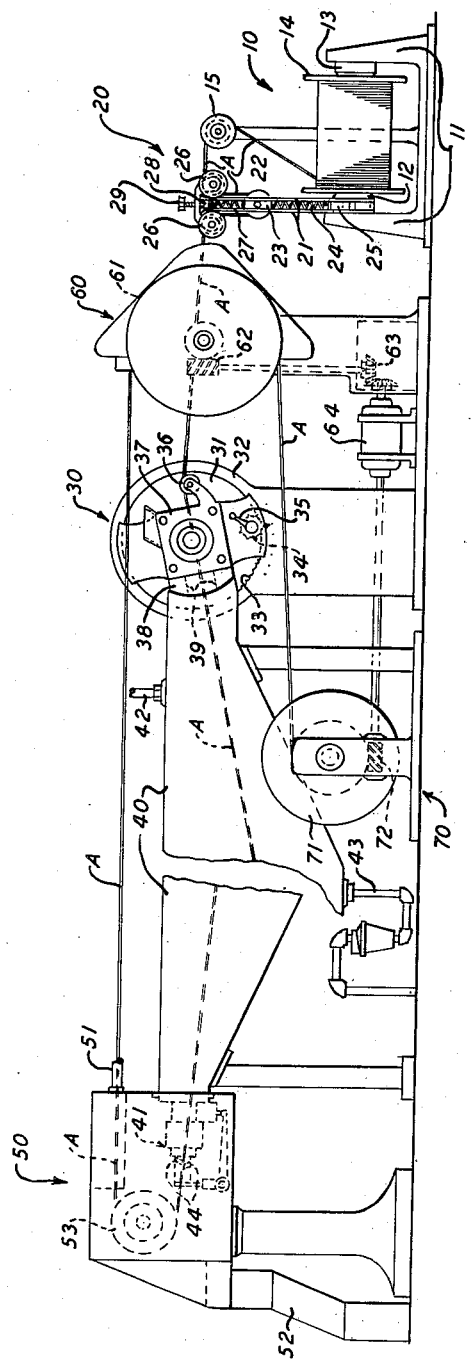
INVENTOR
S. E. BRILLHART
BY
E. R. Nowlan
ATTORNEY Patented June 7, 1938

2,119,570

UNITED STATES PATENT OFFICE 2,119,570

STRAND HANDLING APPARATUS

Samuel E. Brillhart, Towson, Md., assignor to Western Electric Company, Incorporated, New York, N. Y., a corporation of New York Application June 19, 1935, Serial No. 27,381

3 Claims. (Cl. 18—13)

This invention relates to strand handling apparatus and more particularly to apparatus for coating strands with soft, hardenable material such as vulcanizable compounds, enamels having a volatile solvent, and the like, which is hardened after being applied to the strand, by a subsequent treatment.

In the manufacture of coated strands and in particular in insulating wire for electrical conductors with rubber compounds, the strand may be passed through a coating means, such as an extrusion device, to be coated with a hardenable material, such as a vulcanizable mixture containing rubber, which is subsequently hardened, as by vulcanizing in a heated chamber, after which the strand may be taken up on a reel for storage or further use. The freshly coated strand emerging from the coating apparatus comprises a central strand or core of relatively high tensile strength and frequently of relatively great hardness, such as a copper wire, having a coating which may be several times as thick as the core and is relatively soft, yielding and of little tensile strength. It is sometimes a difficult matter to handle the newly coated strand until the coating is hardened in a manner and by means which will not affect it damagingly, either by marring the coating itself or by causing or allowing the core to become displaced from the axis of the combination.

One object of the present invention is to provide an apparatus for coating strands with hardenable material and particularly for insulating electric wires with vulcanizable compounds and subsequently hardening or vulcanizing the coating without harmfully affecting the coating itself or its relation to the core which it covers.

One embodiment of the invention contemplates an apparatus comprising an extrusion press for applying a coating of vulcanizable compound on a wire and a vulcanizing oven to vulcanize the coating so constructed and combined that the coated wire passes directly from the extrusion press into the oven and has no support except its own core wire from the point of leaving the die of the extrusion press until it has been hardened by vulcanization before touching and being supported by the exit sealing device of the oven, the coated wire hanging in a free catenary curve from the die to the seal.

Other objects and features of the invention will clearly appear from the following detailed description of one embodiment thereof taken in connection with the accompanying drawing in which the single figure is a diagrammatic representation of a wire insulating apparatus constructed in accordance with the invention.

In the embodiment of the invention herein disclosed an apparatus for insulating electrical conductor wire with vulcanizable material such as a compound containing rubber, comprises a wire supply device generally indicated at 10, a tension control device generally indicated at 20, an extrusion coating device generally indicated at 30, a vulcanizing chamber 40, a cooling chamber 50, a capstan and drive 60, and a take-up device 70.

The supply means 10 may be of any approved construction comprising stationary means 11 to interchangeably support a supply reel 14 on rotatable stub shafts 12 and 13 journalled in the support 11, and a delivery sheave 15.

A pair of vertical parallel spaced guide supports 21, 21 may be mounted on the support 11 for the tension control means 20. These supports are vertically slotted to receive and confine a sheave 22 freely vertically movable in the slots and so held against displacement horizontally transversely. The axle of this sheave is freely vertically movable between the supports 21, 21 but it and the sheave are held by them against horizontal displacement longitudinally of the machine. To this end this axle is preferably journalled in a yoke 23 having vertical arms sliding between the supports. The lower transverse member of this yoke bears against the upper end of a compression spring 24 whose lower end bears against a brake shoe 25 acting on the stub shaft 12. A transverse stationary top member secured to the supports 21, 21 has two sheaves 26, 26 journalled therein as shown. A compression spring 27 bears at its lower end against the top of the yoke 23 and at its upper end against a block 28 slidable between the supports 21, 21 and controlled by an adjustment screw 29.

The extrusion press 30 may be of any approved construction such for example as is illustrated and described in U. S. Patent 1,823,885 issued September 22, 1931, modified as hereinafter described. This modification consists in so mounting the press or its exit head as to be adjustably tiltable to bring the exit direction of the coated wire from the head below the horizontal by any desired angular amount as required in any individual case. This may be done by mounting the press as a whole in a cradle 31 which is in turn mounted to be rotatable in a stationary support 32. A circular internally toothed gear 33 on the support coacting with a pinion 34 provided with a handle 35 and mounted on the press will then afford means for adjustably tilting the press. The press further has an inlet guide sheave 36 and an extrusion head 37. On the exit side of the extrusion head is secured a sealing member 38 having an arcuate left hand face concentric with the gear 33 and a central bore 39.

The vulcanizing chamber 40 has a flat top and a centrally downwardly bellied bottom proportioned to accommodate any practicable catenary sag of wire passing through the chamber without dragging anywhere against its walls. At its right end the chamber is formed with an end wall arcuately curved to match the seal member 38 and vertically slotted to match the several positions of the bore 39. The exit end of the chamber is provided with an appropriately constructed sealing device generally indicated at 41 and having a sealing member 44, a suitable construction for this device being that described in U. S. Patent 1,885,080, issued October 25, 1932, modified by having the bores of the members 30 and 36 therein widened to permit a wire to pass through at an angle to their common axis. The chamber may also be appropriately provided with an inlet 42 and a suitably trapped outlet 43 for some vulcanizing agent such as hot air or steam.

The cooling chamber 50 may be simply a box provided with a combined air inlet and strand exit 51 and an air exhaust duct 52 connected to some suitable exhaust device not shown. For convenience in illustration the apparatus is shown doubled back on itself at this point, the chamber 50 having a sheave 53 mounted therein to reverse the direction of the strand.

The capstan 60 may be of any appropriate construction, there being many such. It suffices here to say that it has a rotatable barrel 61 around which the strand passes one or more times and which is driven by gearing 62, 63 as indicated from a motor 64 which may also drive the take up reel 71 through gearing 72.

In operation a strand of wire A to be insulated is drawn from the supply reel 14 and passes over the delivery sheave 15, over the first sheave 26, under the sheave 22, over the second sheave 26, behind the capstan 60, over the sheave 36 and through the extrusion head 37 of the press 30. From the head 37 the strand passes freely and untouched and unsupported through the bore 39 and the matching slot in the end wall of the oven 40, through the chamber 40 and its seal 44 by which latter it is touched and supported for the first time since leaving the extrusion head 37. The strand then passes around the sheave 53, out through the exit 51 and on to the capstan barrel 61. It passes one or more times, as necessary, around the barrel 61 and thence to the take-up reel 71 to be wound thereon.

In passing through the extrusion head 37 the wire receives a substantially concentric uniformly thick coating of relatively soft and plastic vulcanizable material such as is familiar to the art of insulating wires, usually containing rubber or the like. In the chamber 40 this coating is gradually converted into a relatively tough, resilient and resistant sheath by vulcanization as for example by steam led in through the inlet 42. From beginning to end of the chamber, i. e., from the head 37 to the seal 44 the strand hangs in a catenary curve, supported only by its core, the shape and sag of the curve depending only on the weight per unit length of the coated strand and on the longitudinal tension imposed on the strand by the capstan at one side and the devices 30 and 20 at the other side. These last two tend to work in opposition as the extruding press tends to push the strand along while the tension device 20 holds it back. By the time the covered strand reaches the seal 44 and passes thence over the sheave 53, the vulcanization of the coating is completed.

Since the coated strand thus is not brought into contact with anything except the vulcanizing atmosphere in the chamber 40 from the time the coating is applied until it is hardened there can be no marring of the coating by any external influence. Since the strand is allowed to sag through the chamber, no undue tensile stress is put on the core strand in the effort to keep it straight, or nearly so, over the relatively long span from the extrusion head 37 to the seal 44, such as may tend to stretch the core within the coating and so rupture the latter. And furthermore, since the coated strand is allowed to hang relatively loosely, yielding naturally to gravitational forces, there is less strain within the coating while still soft tending to make it sag on the core and thus become unsymmetrical thereon under its own weight.

It is found in practice that insulated wires produced in this manner have more homogeneous coatings which ensheathe the core more symmetrically and which are produced with fewer flaws and interruptions than heretofore. It is however important that the sag in the chamber 40 be carefully adjusted and controlled to correspond to the relations between weight per unit length of the core, weight per unit length of coating thereon, initial softness of coating compound, and other factors involved, all of which will vary in individual cases. Thus a thick, relatively hard core, e. g., of bronze wire, with a relatively thin coating applied thereto, could be run through the chamber 40, relatively rapidly, under high tension and with little sag; while if the core were a fine wire of pure soft copper and the coating were relatively thick and heavy, the strand would have to move more slowly to effect complete vulcanization, and would have to be under much lower tension to avoid both stretching of the core and displacement of the soft coating on the core. Hence in the latter case, the coated strand must hang in a much deeper, more sagging catenary through the chamber.

The sag of the catenary is controlled by adjustment of the device 20 and also entails adjustment of the extrusion head 30 to permit the covered strand to leave the extrusion head in the direction of the initial tangent to the catenary, so that the sag will not at once displace the core within the coating.

The embodiment of the invention herein disclosed is illustrative only and may be widely modified and departed from in many ways without departing from the spirit and scope of the invention as pointed out in and limited only by the appended claims.

What is claimed is:

1. In an apparatus for coating a strand with a soft hardenable material, a treating chamber for hardening material applied to the strand, a material applying means having a passage therethru, and means for moving the strand thru said passage to coat the same and for maintaining the coated strand in a free-hanging catenary while being treated in said chamber, said material applying means being positioned adjacent one end of the catenary and having the passage therethru positioned in alignment with said catenary.

2. In an apparatus for insulating wire, a vulcanizing chamber, means having a passage therethru for applying a vulcanizable insulating material to the wire communicating directly with the vulcanizing chamber, and means for moving the wire thru said passage to coat the same and for maintaining the coated wire in a free-hanging catenary while the coating is being vulcanized in said chamber, said means for applying the insulating material being positioned adjacent one end of the catenary and having the passage therethru in alignment with said catenary.

3. In an apparatus for coating a strand with a soft hardenable material, a treating chamber for hardening material applied to the strand, a material applying means having a passage therethru, means for moving the strand thru said passage to coat the same and for maintaining the coated strand in a free-hanging catenary while being treated in said chamber, said material applying means being positioned adjacent one end of the catenary and having the passage therethru positioned in alignment with said catenary, and means for adjusting the material applying means to keep said passage in alignment with differently hanging catenaries.

SAMUEL E. BRILLHART.